US005558314A

United States Patent [19]
Weinstein

[11] Patent Number: 5,558,314
[45] Date of Patent: Sep. 24, 1996

[54] FLUID-LIKE SUPPORT DEVICE

[76] Inventor: James D. Weinstein, 1109 Woodland Dr., Bridgeport, W. Va. 26330

[21] Appl. No.: 373,567

[22] Filed: Jan. 17, 1995

[51] Int. Cl.⁶ .................................................. F16F 3/04
[52] U.S. Cl. ............................ 267/91; 267/142; 267/167; 5/247; 5/255; 5/258; 5/719
[58] Field of Search ............................ 267/75, 121, 142, 267/143, 34, 91, 166, 167; 5/476, 262, 261, 258, 247, 255

[56] References Cited

U.S. PATENT DOCUMENTS

| 710,260 | 9/1902 | Engle | 5/262 |
|---|---|---|---|
| 3,231,906 | 2/1966 | Keeble | 267/91 |
| 5,165,125 | 11/1992 | Callaway | 5/255 X |
| 5,210,890 | 5/1993 | Hagglund | 5/261 X |

FOREIGN PATENT DOCUMENTS

715515  9/1954  United Kingdom ..................... 267/91

*Primary Examiner*—Lee Young
*Assistant Examiner*—Peter M. Poon
*Attorney, Agent, or Firm*—Titus & McConomy

[57] ABSTRACT

A support device having a plurality of support units, each comprising a plurality of flexible, substantially vertical support columns, with the bottoms of the support columns attached at equidistant intervals to a base member and the tops of the support columns attached at equidistant intervals to a substantially perpendicular support platform. The support columns provide directional flexibility to the columns, upon compression, to provide a substantially uniform counter-force through a range of flexion of the support columns and corresponding downward deflection of said support device. Such uniform counter-force during compression simulates a fluid-like support system. The support columns may be comprised of a solid, synthetic foam such as high density polyurethane or springs made of metal or other material. The support units preferably are arranged in a matrix to provide collective support. A stabilization frame and coextensive base member may be used in connection with such a matrix to align individual support units and prevent them from collapsing horizontally during compression. Foam may also be place around and between the individual support units to provide lateral support.

14 Claims, 11 Drawing Sheets

FLUID-LIKE SUPPORT DEVICE

FIELD OF THE INVENTION

The present invention relates to the provision of a fluid-like cushioning effect through a solid, mechanical support device.

BACKGROUND OF THE INVENTION

The standard cushioning support of solid construction (not a water mattress or gel flotation pad) interacts with a body in support whereby the counter-force providing support increases in direct proportion to the downward deflection of the cushioning device. This effect occurs in typical mattress springs and in standard foam or rubber foam constructions. Such cushioning support structures, as a result of such increasing counter-forces, do not fully conform to the body being supported and, instead, cause the body to conform in part to the shape of the support structure.

A water mattress, however, by virtue of hydro-static forces, provides a uniform support and counter-force to a supported body. The counter-forces exerted by a water mattress do not increase in linear response to the amount of deflection of the mattress structure. Consequently, the water mattress much more readily conforms to the shape and contour of the supported body.

Attempts have been made to imitate mechanically this desirable fluid-like support effect. One such means involves using a very thick, soft foam support member which can provide a uniform counter-force to support a rather large surface area and minimizes the counter-force at the greatest areas of deflection. Such a mechanical support member is not practical to use, however, because of the necessary size of such structure and the inconvenience involved in using it effectively.

The support device of the present invention overcomes these deficiencies through use of plurality of individual support units having two or more support columns which act together to provide a uniform counter-force through a given range of deflection. Such support columns may be comprised of solid, synthetic foam such as high density polyurethane or springs made of metal or other material. The support columns are formed to facilitate flexion in a desired direction, while providing a substantially uniform counter-force, which provides a desirable contribution to the field of cushioning support devices.

Accordingly, it is an object of the present invention to promote a solid, mechanical support device that offers a fluid-like cushioning effect in a practical and usable manner. The support device of the present invention has application in mattresses, seats for, among other things, automobiles, airplanes and theaters, and office and home furniture.

SUMMARY OF THE INVENTION

The present invention generally comprises a support device of solid construction which provides a uniform, fluid-like counter-force through the range of deflection caused by the body being supported. In particular, the support device in accordance with this invention includes a plurality of support units, each having a plurality of support columns which attach to a base and which join together at a top area. Additionally, the cushioning support unit may include a flat support surface or platform at the top area to which the support columns support or attach. The support columns are formed to facilitate flexion in a selected, desired direction. In preferred embodiments, the support columns are comprised of solid, synthetic foam such as high density polyurethane or springs made of metal or other material.

In operation, the support device provides a substantially uniform counter-force over a range of downward deflection resulting from flexion of the support columns. More specifically, the support device experiences an initial compression phase, followed by a flexion phase, upon downward deflection. In the compression phase, the counter-force is built quickly until the flexion phase begins to act. During the flexion phase, the counter-force tends to remain substantially constant despite continued downward excursion of the device and the body being supported by it. As downward deflections occur through the flexion phase, during which substantially uniform counter-force is applied to the body in support, a fluid-like flotation support is simulated. Similar to a fluid support, the counter-force acting over the surface area of the supported body, through a range of deflections, is substantially uniform and the surface elements of the support device have horizontal mobility. The device's resistance to deformation, the duration of the flexion phase and the amount of counter-force provided to the body supported by the device vary according to the length, width and general shape of the columns and the elasticity of the foam or spring comprising the individual support units. A thick column, for example, will provide a greater resistance to deformation and will also provide a higher uniform counter-force during compression or flexion.

In accordance with the preferred embodiment of this invention, the support columns can have a straight, bent or curved form. Such support columns are spaced equidistant from each other in order to provide uniform support and are symmetric in relation to the vertical center of the support structure. In a preferred embodiment employing two bent or curved support columns, the shape formed by the support columns, from a side view before compression, can vary and may include, without limitation, a circle, oval, figure eight, diamond or rhomboid.

The cross-sectional area of each support column, whether comprised of foam or a spring, preferably defines a circle or rectangle, although other geometric shapes such as, without limitation, an oval, diamond, triangle or rhomboid may be defined by this cross-section. The cross-sectional shape of the support columns may vary along the lengths of such columns.

When compressive forces are applied to the top of the support device, as when the device provides support to a body, the support columns of each support unit preferably flex symmetrically so as to provide stability to the support unit. Specifically, an outward, inward or angled symmetrical deflection of the support columns (with reference to the vertical center of the support unit) provides lateral stability together with the desired substantially constant counter-force during deflection. Where lateral support is otherwise provided to a support unit, however, such as in the support matrices described below, symmetrical deflection of the support columns is not necessary.

In the preferred embodiment of this invention comprising foam support columns, flexion of foam support columns can be facilitated in desired directions by making vertical or horizontal cuts or slits in such columns. Such slits or cuts can be made to the exterior or interior of the supports columns and also at the point where the columns join the base member to help guide the direction in which the columns will deflect during compression. Foam support columns can also be pre-set to desired directions of flexion by flexing the columns along their length in the desired direction of flexion, which may either inward or outward, and attaching these column members, as bent, to the base member and top area of each support unit. Such pre-bending of the foam support columns, although it may increase the initial compression phase, provides necessary stability to the device as a whole.

Also in the preferred embodiment of this invention employing foam support columns, it is further preferred that the base member and support platform, if employed, are also comprised of foam, and that all such elements of each support unit, i.e., the support columns, the base member and the support platform, if employed, are formed or molded from a single piece of foam. Alternatively, each individual element of the support structure can be formed separately from foam and joined together by glue or other means of attachment.

In the preferred embodiment of this invention employing springs for support columns, such springs can be caused to deflect in a desired direction by pre-bending the springs in such direction or placing a bend in the springs while attaching them to the base member and at the top area of each support unit. Such bending can occur along the length of the spring or at a specific spring coil or coils. Where metal springs are employed, attachment to the base member and to each other or to the support platform at the top area of each support unit can be accomplished by means of welding or other means for attaching metals. Additionally, the metal springs can be inserted into the base member and support platform. Preferably, the spring support columns, base member and support platform, if used, are all comprised of the same material. However, the materials comprising the base member and support platform may differ from the material comprising the springs.

Also in the preferred embodiment of this invention employing metal springs, such springs are preferably of a composition and design which will resist compression but readily bend or flex, providing a substantially uniform counter-force during the flexion phase of such springs. The springs comprising the support columns are preferably comprised of metal, although other materials may be used.

The support columns in a given support unit may have different lengths, degrees of pre-bending or different numbers or locations of bends or slits to provide a contoured effect to the surface of the support device.

In the support device, the support units are arranged in a matrix to provide collective support and also to provide lateral support. In particular, where the cross-sectional area of spring-comprised support columns is circular, it has been found that additional stabilizing means are needed in order to prevent the support device from moving too far, as a whole, in a sideways direction. Specifically, even where circular springs are pre-bent to facilitate flexion in a desired direction, such circular springs continue to have tendencies to deflect in other directions. Providing more than two such support columns counter-acts such tendencies. Additionally, increased stability can be provided through use of springs having elliptical or rectangular cross-sections, which have increased tendencies to bend only in one direction (after pre-bending) and, if aligned so that such directional tendencies are in opposite directions, act to prevent sideways collapse of each support unit and the support device. Lateral support best can be provided, however, by positioning support units within the support device such that they provide lateral support to each other.

Such inter-active lateral support can be provided by allowing the support units to come in contact with each other at the farthest point of flexion. Alternatively, lateral support can be provided through additional structures attached to the matrix of support units forming the support device. In a preferred embodiment, such stabilization can be provided to a matrix of support units by (i) connecting the support platforms and base members of each respective support units together, (ii) attaching the support platforms and base members of each support unit to coextensive base and support members, or (iii) both. As a further alternative, foam can be placed between the support units and a surface attachment of the support elements to such foam interstices can also be effected as an adjunct to stability.

Other objects and a fuller understanding of the invention will be had by referring to the following description of the Presently Preferred Embodiments of the Invention taken in conjunction with the accompanying drawings.

PRESENTLY PREFERRED EMBODIMENTS OF THE INVENTION

Figure 1:
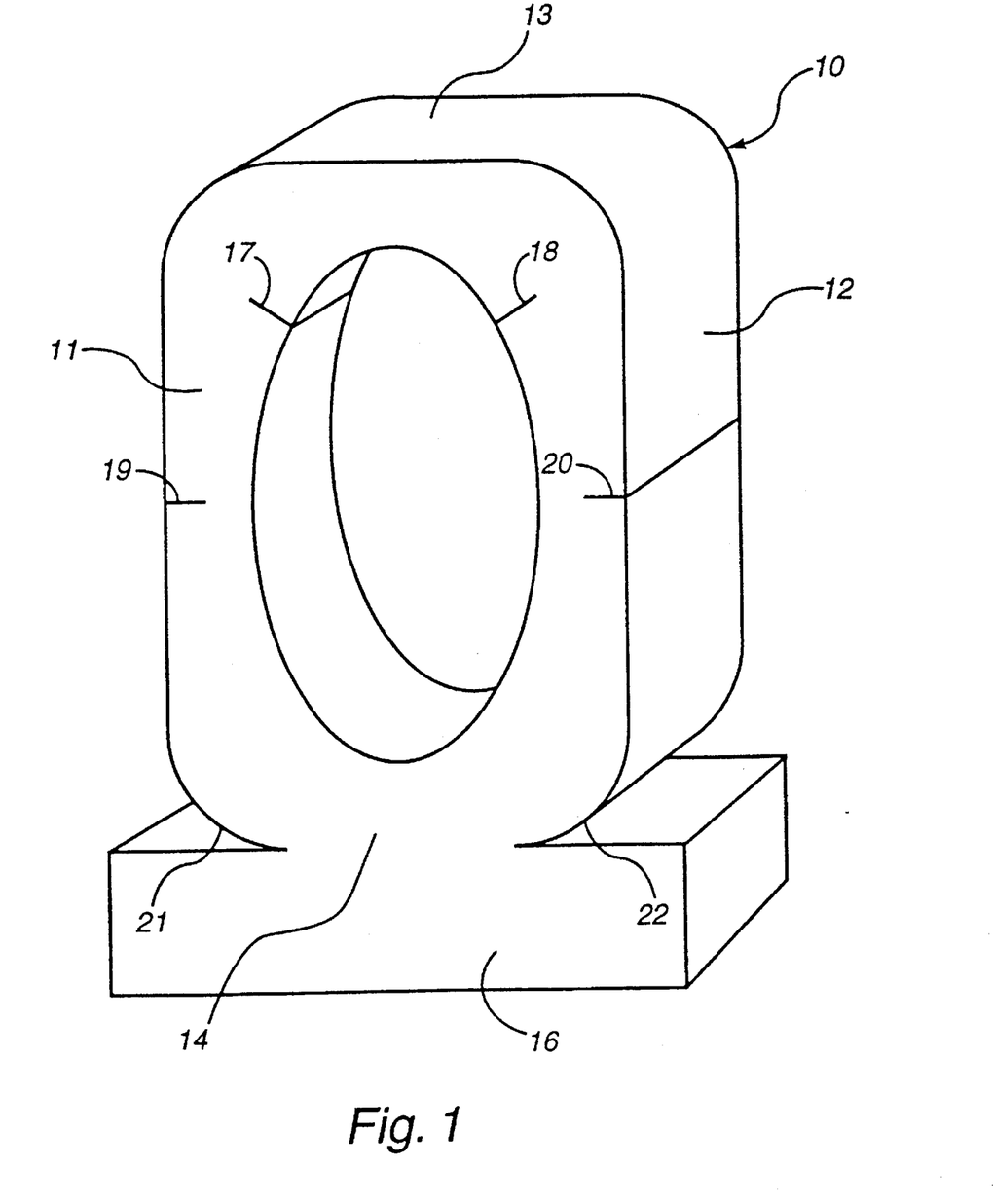
FIG. 1 is an isometric frontal view of a preferred embodiment of the support device of this invention.
Figure 2:
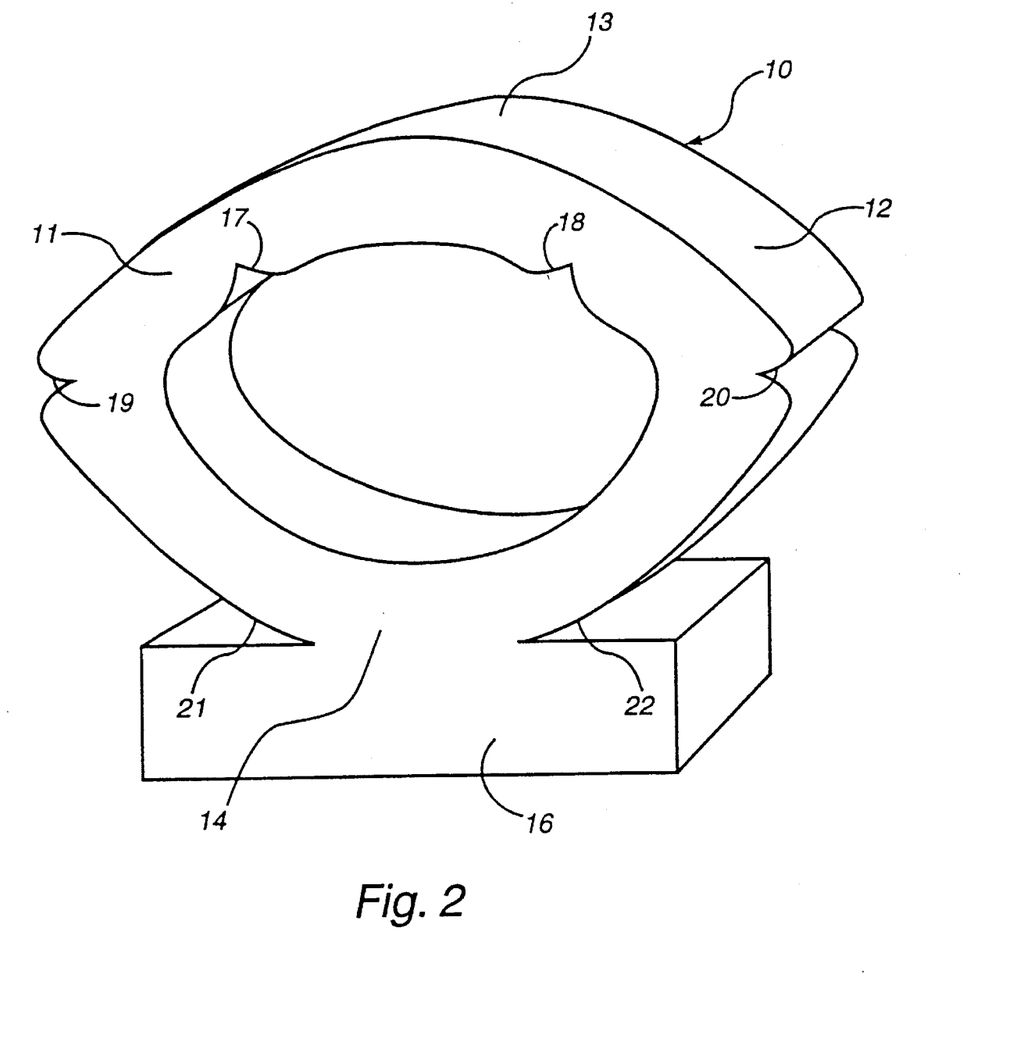
FIG. 2 is an isometric frontal view of the embodiment of this invention illustrated in FIG. 1 under compression.

Referring to FIGS. 1 and 2, support unit 10 in accordance with a preferred embodiment of this invention comprises two support columns 11 and 12 which are joined at top area 13 and bottom area 14 and also at base 16. Support columns 11 and 12 may, alternatively, attach separately to base 16 such that they do not attach to each other.

Support unit 10, as depicted in FIGS. 1 and 2, is formed or molded from a single piece of solid, synthetic foam such as high density polyurethane. Alternately, support columns 11 and 12, together with base 16, may be separately formed or molded from foam and attached to each other to form unit 10 by glue or other attachment means. Base 16 also may be comprised of a material other than foam. A foam composition for the columns 11 and 12 is necessary, however, in order to allow for desired flexion in such columns.

In the preferred embodiments of the invention, support columns 11 and 12 may also be comprised of springs made of metal or other material. Where springs are employed, base 16 is preferably comprised of the same material as the springs, although different materials may be used. Attachment of columns 11 and 12 to each other and to base 16 may be accomplished, when comprised of metal, by welding or soldering and also by mechanical or adhesive means of attachment. If comprised of other than metal, mechanical or adhesive means of attachment can again be used.

In FIGS. 1 and 2, the preferred embodiment of the invention depicted therein comprises support columns 11 and 12 having a rectangular cross-section. This cross-sectional area, for both foam and spring support columns, may also define other geometric shapes including, without limitation, a circle, oval, triangle, diamond and rhomboid. In addition, the cross-sectional area of support columns 11 and 12 may change in terms of both geometric shape and area along the length of support columns 11 and 12.

Figure 3:
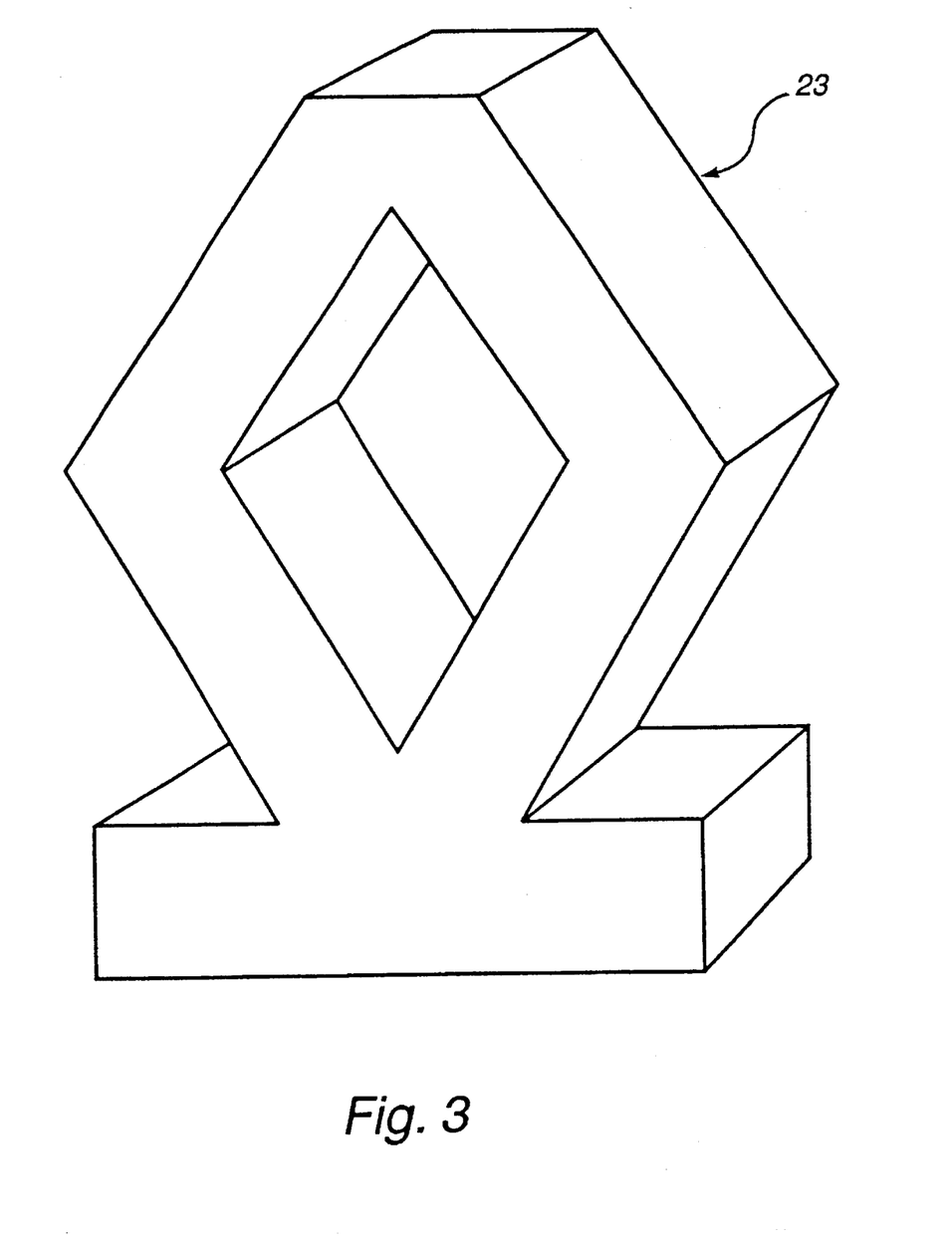
FIG. 3 is an isometric frontal view of an alternative embodiment of this invention.
Figure 4:
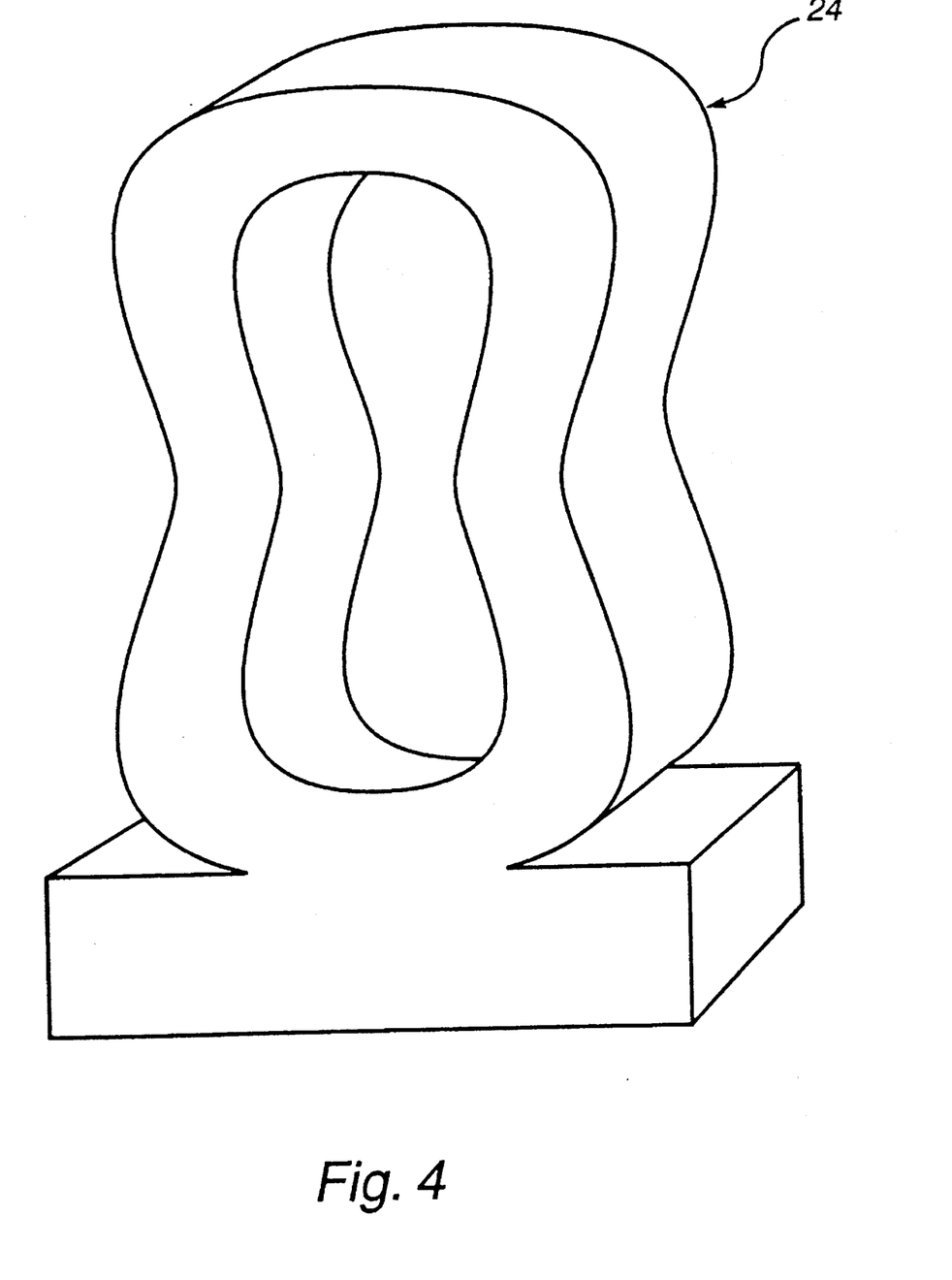
FIG. 4 is an isometric frontal view of an alternative embodiment of this invention.

Referring to FIG. 1, the geometric shape formed by the two support columns 11 and 12, before compression is an oval (as depicted in the side view shown in FIG. 1). Such support columns can also be bent, molded or formed to define other geometric shapes including, without limitation, an oval, figure eight, diamond or rhomboid. Referring to FIGS. 3 and 4 in particular, the preferred embodiments of this invention employing two support columns may also resemble, without limitation, a diamond such as support unit 23 in FIG. 3 or a figure eight such as support unit 24 in FIG. 4. In addition, more than two support columns can be employed. In FIGS. 1 through 4, all support columns are spaced equidistant from each other and are symmetrically shaped in reference to the vertical center of the support unit so as to provide uniform flexion and support. In alternative embodiments, support columns having different lengths, shapes or bends may be employed.

With reference to FIGS. 1 and 2, where support members 11 and 12 are comprised of foam, slits 17, 18, 19 and 20 can be added to support unit 10 to aid the flexion of support columns 11 and 12 in desired directions. Such slits can be positioned anywhere on the interior or exterior of support columns 11 and 12, and are not limited to the number and location of the slits illustrated in FIGS. 1 and 2. In addition, such slits or cuts can be used with other support column shapes including those depicted in FIGS. 3 and 4. Undercuts 21 and 22, which are located at the point where support columns 11 and 12 join base 16, further aid the positioning of the flexion of support columns 11 and 12. Such undercuts may also be employed with other support column shapes.

Referring specifically to FIG. 2, support structure 1 is positioned for operation such that top 13 receives the weight or force from the body to which support unit 10 is to provide support. Upon experiencing such weight or force, support columns 11 and 12 flex or bend outwardly as support unit 10 compresses, and as is shown in FIG. 2. In the preferred embodiment of the invention depicted in FIG. 2, the outward bending or flexion of support columns 11 and 12, as well as that of the analogous support columns in FIGS. 3 and 4, is symmetrical with reference to the vertical center of support unit 10. Support columns 11 and 12 may also be formed, molded or bent to flex symmetrically inward or at some other angle with reference to the vertical center of support unit 10. In alternative embodiments, support columns may all flex in the same direction or non-symmetrically.

Figure 5:
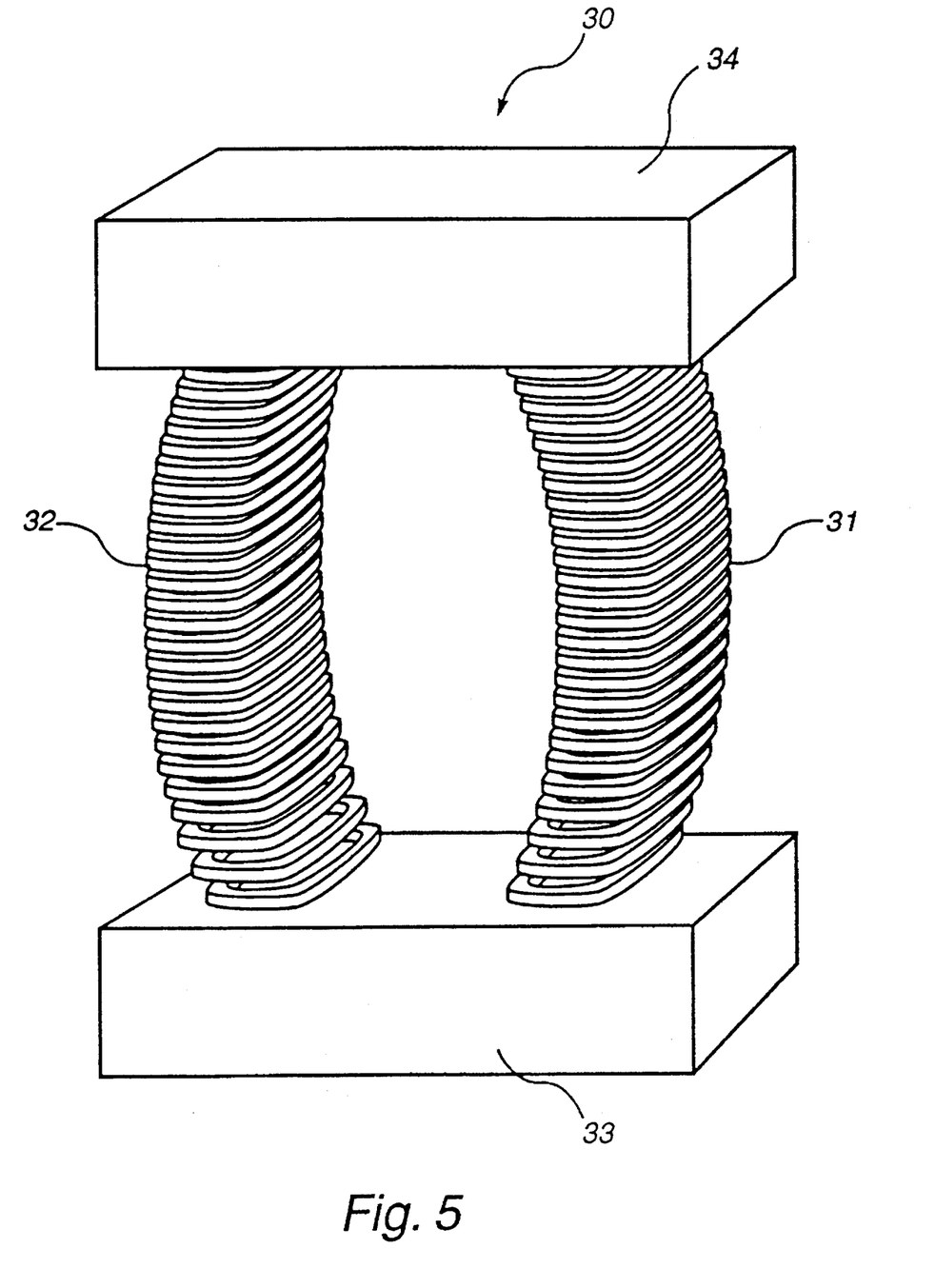
FIG. 5 is an isometric frontal view of an alternative embodiment of this invention.

Referring to FIG. 5, support unit 30 is a further alternate preferred embodiment of the invention comprising two support columns 31 and 32 joined separately to base 33 and support platform 34. In this preferred embodiment of the invention, as depicted in FIG. 5, support columns 31 and 32 are formed from springs which may be comprised of metal or other similarly resilient material. Support columns 31 and 32 may alternatively be comprised of foam such as high density polyurethane. Base 33 and support platform 34 may be comprised of the same material as support columns 31 and 32, but also may be comprised of other materials.

Support columns 31 and 32 are attached to base 33 and support platform 34 by mechanical or adhesive means. If support columns 31 and 32 are comprised of metal, welding or soldering may also be used as a means of attachment.

Support platform 34 provides direct support to a portion of the surface area of a body in support. Similar support platforms may be used in other embodiments of the invention, including without limitation, those depicted in FIGS. 1–4.

Support columns 31 and 32 are formed in a straight or linear shape. During the attachment of support columns 31 and 32 to base 33 and support platform 34, support columns are bent in the manner depicted in FIG. 5. This bending aids the deflection of support columns 31 and 32 in a symmetrically outward direction during compression of support unit 30. Support columns 31 and 32 can alternatively be bent during attachment so as to cause deflection or flexion symmetrically inward or at some other angle with reference to the vertical center of support structure 30. As with the preferred embodiment generally discussed in connection with FIG. 1, additional support columns may also be added to support unit 30, with all support columns being spaced equidistant from each other and having symmetric shapes and flexion.

Alternatively, support columns having different lengths, shapes and/or points of bending may be used to provide a slope or incline to support platform 34. In a matrix of support units, varying degrees of slope or incline and heights for each unit can be positioned to provide a contoured support surface. In preferred embodiments, such variations in slope and height of support units in a support device is provided through use of support platforms having identical lengths but different angles of pre-bending.

Figure 6:
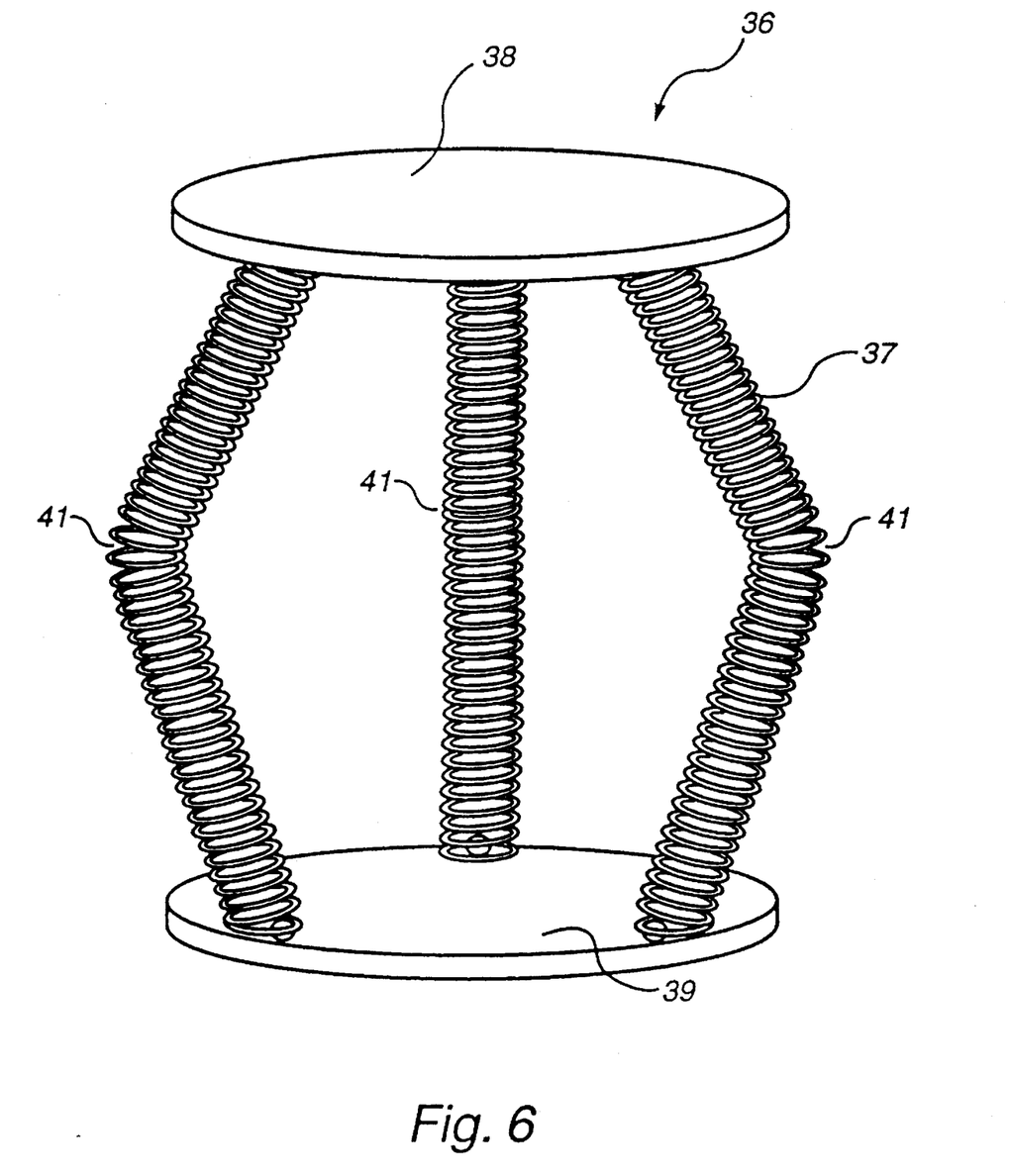
FIG. 6 is an isometric frontal view of an alternative embodiment of this invention with three support columns.

Referring to FIG. 6, support unit 36 is a further preferred embodiment of this invention comprising three support columns 37, a ring-like support platform 38 and a ring-like base 39. Support unit 36, as depicted in FIG. 6, has support columns 37 which are comprised of circular coil springs. As with other preferred embodiments, support columns 37 may otherwise be comprised of foam and have differing cross-sectional areas and forms.

Support columns 37 are spaced and attached to support platform 38 and base 39 at equidistant intervals. Each support column 37 has a permanent bend 41 in the spring coil in the middle of each such support column. Bend 41 assists each support column 37 in bending or flexing outward in the direction of the open area of bend 41. Bend 41 can also be made to facilitate flexion inward toward or at some other angle with reference to the vertical center of support unit 36. Additionally, other permanent bends may be made in other locations along the length of support columns 37.

Support platform 38 and base 39 are depicted as rings in FIG. 6, but may take other shapes as well, including, without limitation, solid forms.

Figure 7:
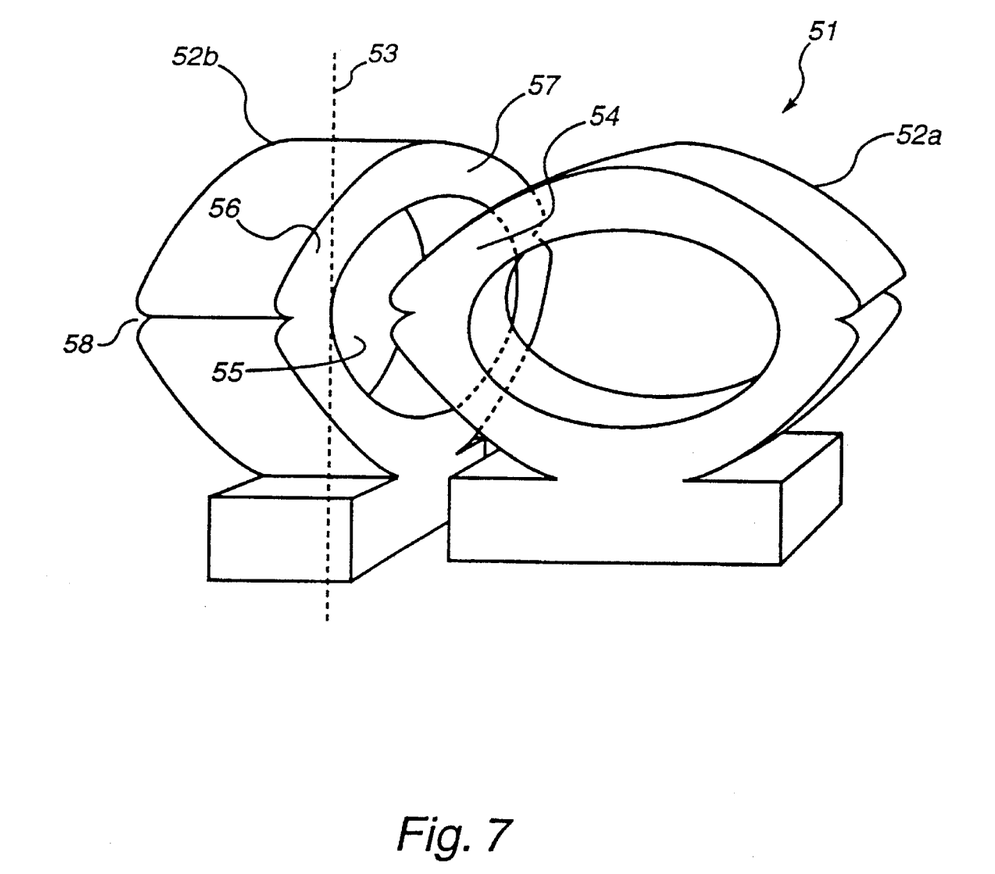
FIG. 7 is a side view of the support device of this invention with two support units positioned to provide collective support.

Referring to FIG. 7, support device 51 depicts identical support units 52a and 52b which are aligned to collectively provide cushioned support to a body. In this preferred embodiment of this invention, such alignment involves placing unit 52a adjacent to identical support unit 52b in such a manner that unit 52b is rotated ninety degrees along its vertical axis 53 in orientation to unit 52a. Such alignment allows support column 54 of unit 52a to deflect into the opening 55 created between support columns 56 and 57 of unit 52b when units 52a and 52b are under compression, without inhibiting the flexion of support column 54. Narrowed regions 58 can be formed or molded into support columns 56 and 57 to further aid the receipt of support column 54 by unit 52b without inhibiting the flexion of support column 54.

In a preferred embodiment, units 52a and 52b are aligned close enough to each other such that contact occurs between units 52a and 52b at the greatest range of deflection. Such contact provides lateral inhibition to the possible sideways collapse of units 52a and 52b.

In the preferred embodiment of this invention, units 52a and 52b would be part of a larger matrix of similar individual support units, each interacting with another in the same manner that units 52a and 52b interact. More specifically, support columns 56 and 57 would each flex outward into adjacent support units, which, in turn, would interact with other support units. Unit 52b would also receive a support column from a support located on the side of unit 52b opposite to unit 52a.

Such a matrix of support units can be employed with both foam and spring support columns. Additionally, matrices may be similarly employed where more than two support columns exist in an individual support unit.

Figure 8:
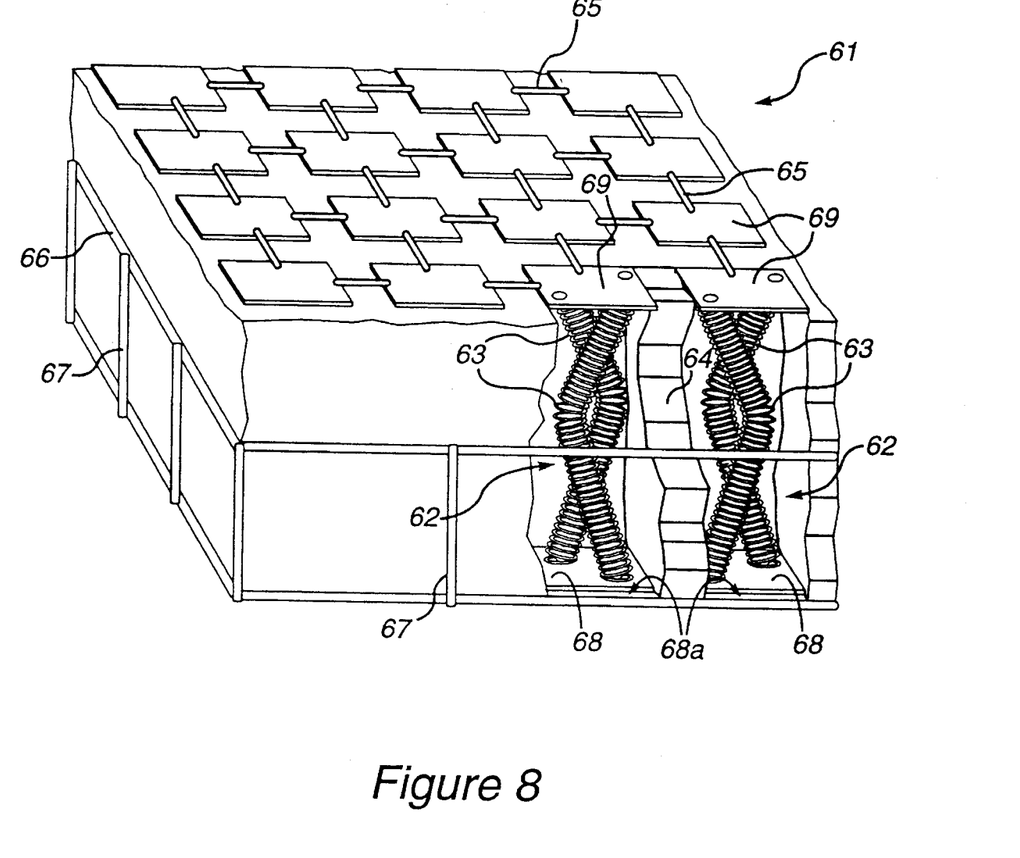
FIG. 8 is an isometric view of the support device of this invention.

FIG. 8 depicts support device 61 with a matrix of support units 62, each having two spring-comprised support columns 63. The number of individual support units 62 in support device 61 can vary. Foam 64 is located between adjacent support units 62 and provides lateral support to each support unit and support device 61 as a whole. Flexible connectors 65 join adjacent support platforms 69 and also provide lateral support. Connectors 65 can be comprised of plastic, rubber or other flexible material. Attaching the support members 69 directly to the foam elements 64 can also subserve this function. Frame 66, located approximately mid-height of support device 61 provides outer lateral support to foam 64 and attaches by rods 67 to coextensive base 68a. Frame 66 alternatively can be located within the same plane as the individual support platforms 69 and can be joined to the exterior support platforms 69 by connectors 65. In a further alternative embodiment, frame 66 can be eliminated. Individual base members 68 in each support unit 62 attach to base 68a.

The alternative embodiments of support units discussed above may be used in connection with support device 61. Also, individual support units 62 can be rotated 90 degrees in alternating support units so that the support columns 63 in alternating support units 62 flex perpendicular to each other and, as a result, provide additional lateral support.

Figure 9:
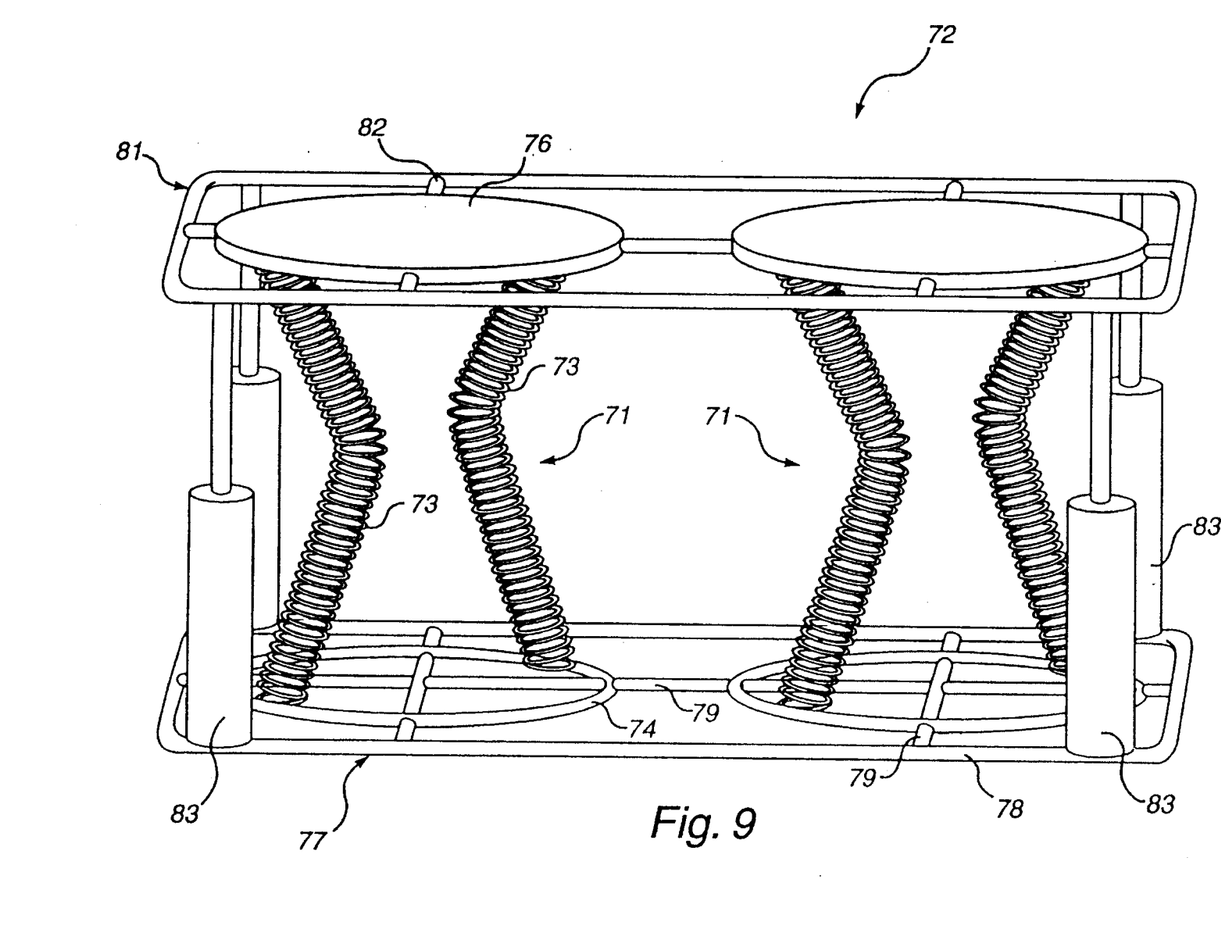
FIG. 9 is an isometric view of the support device of this invention with two support units inter-connected to provide collective support and stability.

Another preferred embodiment of the invention is shown in FIG. 9, with support units 71 aligned in support device 72 to provide horizontal stability and the combined support of two or more support units 71 to a body. Support units 71 in support device 72 are comprised of two springs 73 with circular cross-sections and which are pre-bent in an inward direction. Preferably, springs 73 are not bent directly towards the center of support structure 71, but rather are bent to symmetrically flex slightly off-center so that springs 73 do not come in contact during compression and flexion. Base members 74 and support platforms 76 are both circular rings to which springs 73 are attached at directly opposite ends (180 degrees apart along the diameter of the rings).

Other forms of support units, as described above, may be employed in support device 72, including support units having more that two support columns or utilizing foam. Additionally, it is preferable that a plurality of support units comprise support matrix 72. FIG. 8 is provided to demonstrate the interaction between two support units in one preferred embodiment.

Referring again to FIG. 9, base members 74, in turn, attach to a coextensive base 77. Base 77, as depicted in FIG. 8, is comprised of an outer frame 78 and interior support members 79 which are attached to frame 78 in a cross-hatched configuration. Base members 74 attach directly to support members 79. Other configurations of support members 79 can be utilized.

Alternatively, base 77 may be comprised only of outer frame 78, with those base members 74 located contiguous thereto attaching directly to frame 78 and adjacent base members 74 attaching directly to each other. As a further alternative, base 77 can be solid through-out, with either base members 74 or springs 73 attaching directly thereto (where springs 73 attach directly to base 77, base members 74 are not employed).

At the upper region of support device 72, support platforms 76 attach to a coextensive stabilizing frame 81, which defines the outer perimeter of support device 72. Support platforms 76 located contiguous to frame 81 attach directly thereto, and in the interior region of stabilizing frame 81, adjacent support platforms 76 attach directly to each other, with such attachments occurring by and through connectors 82.

Pistons 83 are located at the perimeter of frames 78 and 81. Pistons 83 serve to align base 77 with frame 81 and prevent support device 72 from collapsing in a sideways direction during compression and flexion. Other locations of piston 83 are possible. During compression and flexion, pistons 83 also compress and, consequently, do not impede compression of support device 72.

Figure 10:
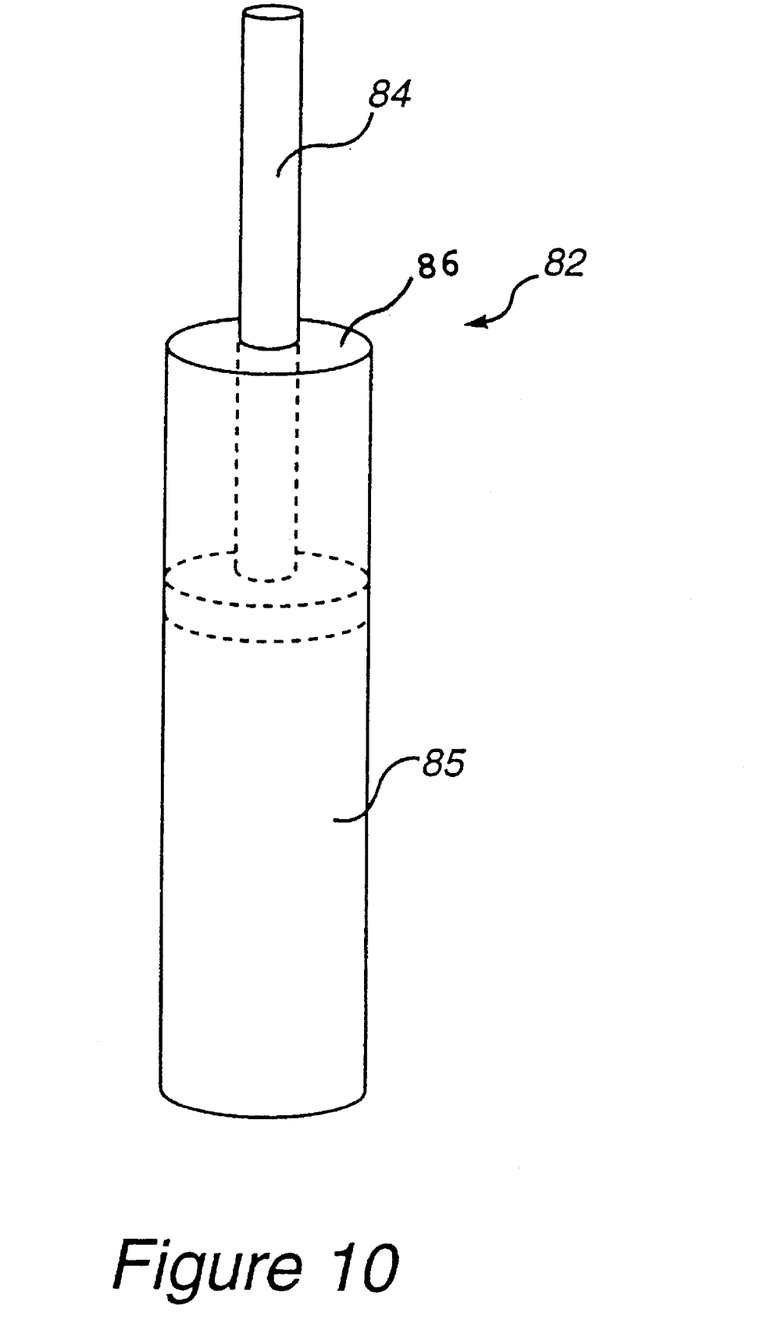
FIG. 10 is a side view of the piston shown in FIG. 9.

Piston 83 is more fully depicted in FIG. 10. Piston 83 comprises a rod 84 located within cylinder 85. Stop 86 prevents rod 84 from detaching from cylinder 85. Lubrication is preferably provided to thee interior of piston 83 to allow rod 84 and cylinder 85 to operate together with as little friction as possible.

Figure 11:
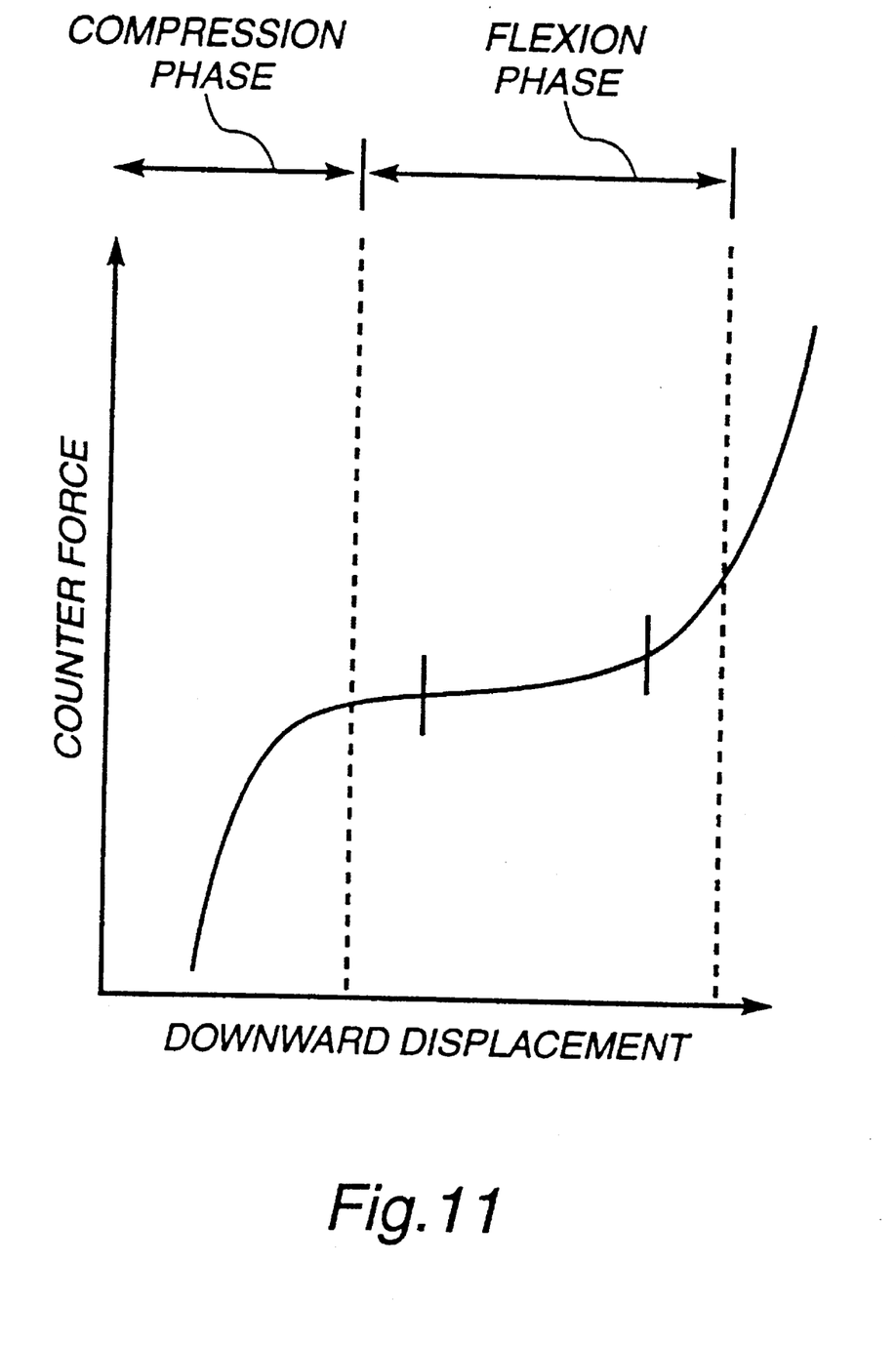
FIG. 11 is a graph demonstrating the uniform counter-force provided by this invention during a range of deflection.

FIG. 11 is a graph reflecting the counter-force versus displacement relationship of the support structures. On the x-axis, increasing downward displacement of the support structures is reflected as one moves from the origin. On the y-axis, the increasing counter-force asserted by the column support device is reflected. FIG. 9 shows the two phases of compression and flexion. During the compression phase, the counter-force builds quickly until the flexion phase begins. After the flexion phase begins, the counter-force remains constant. In preferred embodiments of the invention, all deflections or flexion of the support columns occur in the substantially flat portion of the curve.

The flat portion of the compression-deflection curve corresponds to the substantially uniform pressure which occurs during flexion, with the beginning of this flat portion of the curve corresponding to the point at which the support columns begin to flex (flexion point pressure). From this point until flexion is complete, during which time a large compression of the support device occurs, whereby the distance between the top area of the support device and the base decreases significantly, the counter-pressure tends to remain constant by nature of the properties of the support columns.

Factors determining the initial level of compression are, for the foam embodiment: (1) relative thickness of the support columns, (2) the design of the bends in the support columns, and (3) the inherent characteristics of the foam, which must be of a firm, but flexible, composition. For the spring embodiment, such factors are: (1) the spring length and cross-sectional shape and area, (2) the design of the pre-set bend(s) or angulation in the support columns, and (3) the inherent characteristics of the spring.

The flexion point pressure determines how much support each support device provides. For example, a seat design employing a matrix of twenty (20) support units, with each such unit having a flexion point pressure of twelve (12) pounds, will support 240 pounds before "bottoming out" and losing its fluid-support effect. Similarly, a support device supporting a human trunk of 15"×30" might have approximately 50 units of support. If each unit has flexion point pressure of six (6) pounds, the support device could support 300 pounds. The flexion point pressure for a particular support unit can be designed into a unit by varying the parameters discussed above. Testing of particular designs to arrive at a particular flexion point pressure can be done through use of a standard grocery-type scale.

What is claimed is:

1. A support unit having a vertical center and comprising:
   a. a base member;
   b. a support platform; and
   c. a plurality of support columns, each said support column having a top and bottom, with the bottoms of said support columns attached at equidistant intervals to said base member and the tops of said support columns attached at equidistant intervals to said support platform, each said support column comprised of a coiled, curved spring flexible along the entire: length of said column, and said support columns further being positioned and operable to flex, in response to application of a compressive force against said support platform, in a uniform symmetric manner, with reference to each other and the vertical center of said support unit and also to provide a substantially uniform counter-force through a range of flexion of said support columns and corresponding compression of said support unit.

2. The support structure of claim 1 wherein said springs are metal.

3. The support device of claim 1 wherein said springs contain at least one permanent bend to facilitate flexion of said support columns in a desired direction.

4. The support device of claim 1 wherein each said support column is bent along its length during attachment to said base and said support platform to facilitate flexion of said support columns in a desired direction.

5. A support device comprising a plurality of interconnected support units positioned to form a matrix with an outer perimeter, each said support unit having a vertical center and comprising:
   a. a base member;
   b. a support platform; and
   c. a plurality of support columns, each said support column having a top and bottom, with the bottoms of said support columns attached at equidistant intervals to said base member and the tops of said support columns attached at equidistant intervals to said support platform, each said support column comprised of a coiled, curved spring flexible along the entire length of said column, and said support columns further being positioned and operable to flex, in response to application of a compressive force against said support platform, in a uniform symmetric manner, with reference to each other and the vertical center of said support unit and also to provide a substantially uniform counter-force through a range of flexion of said support columns and corresponding compression of said support unit.

6. The support device of claim 5 further comprised of:
   a. flexible connectors connecting adjacent support platforms;
   b. a coextensive base member to which said base member in each support unit attach;
   c. a foam grid located around and between said support units to provide lateral support to said support units and said support device; and
   d. a stabilizing frame attached to said coextensive base member and located around the outer perimeter of said support device, said stabilizing frame acting to provide further lateral support and stabilization to said support units and said support device.

7. The support device of claim 6, wherein said flexible connectors connect said stabilizing frame to said support platforms of each said support unit lying along the outer perimeter of said matrix.

8. The support device of claim 5, wherein said support device further comprises flexible connectors connecting adjacent support platforms.

9. The support device of claim 5, wherein said support device further comprises a coextensive base member to which said base members in each support unit attach.

10. The support device of claim 9, wherein said coextensive base member attaches directly to said support columns in each said support unit and forms said base member for each said support unit.

11. The support device of claim 5, wherein said support device further comprises a stabilizing frame which is attached to a coextensive base member and is further attached by said flexible connectors to said support platform of each said support unit lying along the outer perimeter of said matrix.

12. The support device of claim 11, wherein said stabilizing frame is attached to said coextensive base member by at least two pistons attached to said coextensive base member and said stabilizing frame, said pistons acting to position said stabilizing frame above said base member and having the ability to compress without inhibiting the flexion of said support columns in each said support unit.

13. The support device of claim 5, wherein said support columns flex symmetrically outward from the vertical center of each said support unit and said support units are positioned side-by-side in such a manner that the space created between adjacent support columns in each of said support units, when deflected outward upon compression, increases in width and receives the support column of at least one adjacent support unit during compression.

14. The support device of claim 5, 12, 10, 8, 9 or 11, wherein said support device furthers includes a grid structure comprised of foam and located around and between said support units to provide lateral support to said support units and said support device.

* * * * *